B. Bicknell,
Planing and Matching Machine.
N°3,961. Patented Mar. 21, 1845.
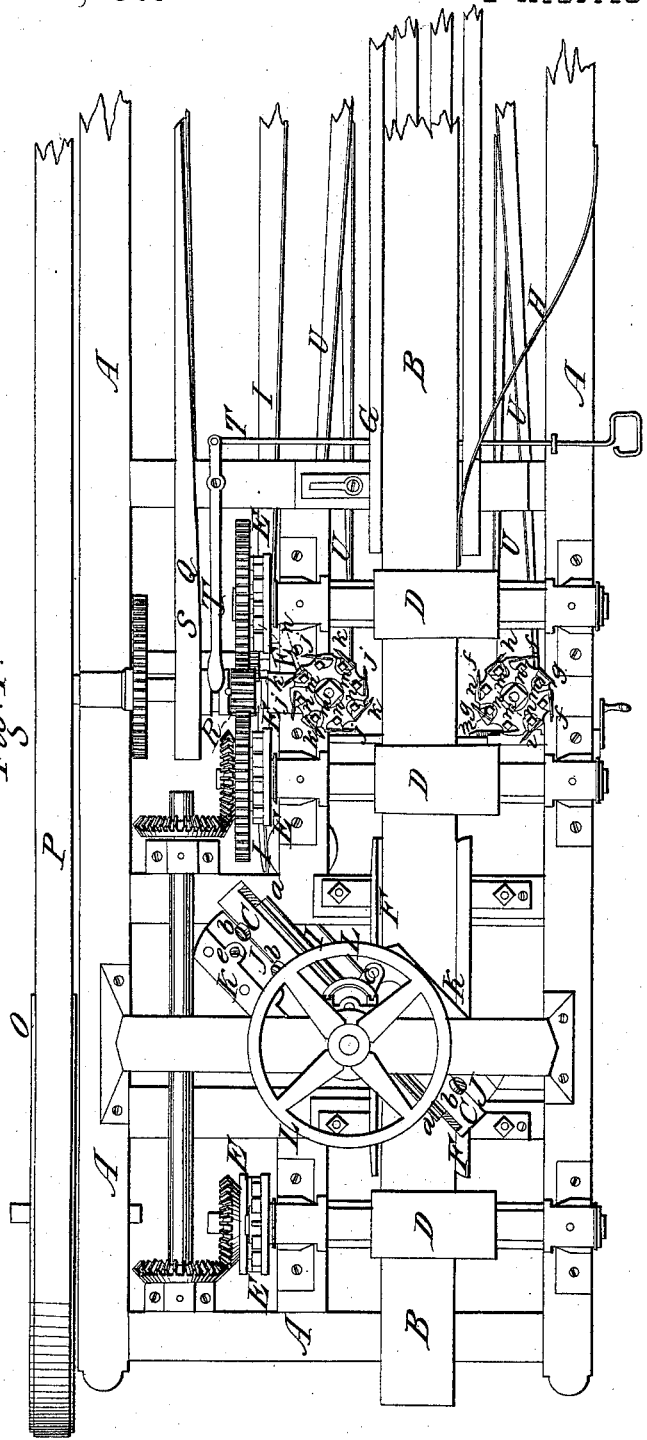
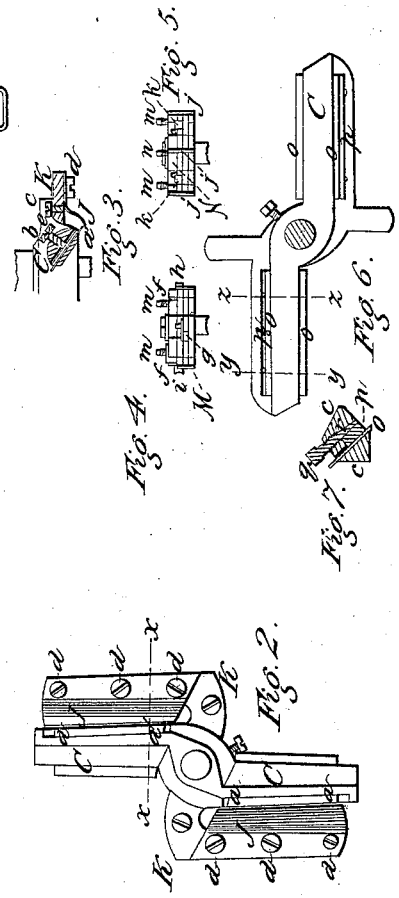

UNITED STATES PATENT OFFICE.

BENJAMIN BICKNELL, OF CINCINNATI, OHIO.

METHOD OF FASTENING CUTTERS IN MACHINERY FOR PLANING LUMBER.

Specification of Letters Patent No. 3,961, dated March 21, 1845.

*To all whom it may concern:*

Be it known that I, BENJAMIN BICKNELL, of the city of Cincinnati, in the county of Hamilton and State of Ohio, have made certain new and useful improvements in the manner of constructing machines for planing, jointing, tonguing, and grooving boards or planks; and I do hereby declare that the following is a full and exact description thereof.

In my machine the planing is effected by means of two or more plane irons or cutters which are placed upon a dishing wheel or rather upon arms affixed to a shaft which is made to incline from a vertical position usually about one inch to the foot. The lower sides of the arms which carry the cutters form an obtuse angle with the axis of the shaft inclining upward therefrom in the same degree in which the shaft is inclined from the perpendicular so that in the revolution of said shaft the edges of the cutters shall when at their lowest point be in a horizontal position which is that in which they act upon the board or plank. Instead of the arms there may be a dishing or conical wheel; and in speaking of the planing apparatus I shall, sometimes therefore denominate it the planing wheel; this planing wheel it will be seen resembles such as have been before used. The cutters of this wheel are so combined and arranged as to give to them what I denominate a longitudinal spiral action as they plane the board, by which action they are prevented from cutting along any considerable part of their length at the same instant, when one end of the knife is cutting the other being raised from the board the cutting action of its edge being successive and not simultaneous along its whole length. This action commences at the heel of the cutter and cuts obliquely across the board by a shaving motion that entirely obviates that tearing or eating so common in cross grained and knotty stuff which results from the usual manner of arranging such cutters. The particular manner of effecting this will be presently explained. The cutters move in a direction the reverse of that of the stuff which is being cut and along and close to their cutting edges there extends a piece of iron or steel plate constituting a spring slide which bears upon the board with sufficient force to hold it firmly down upon its bed, thus counteracting the lifting action of the cutters. This spring is capable of being adjusted by set screws, and serves not only to regulate the cut but bears the board down and prevents its chattering. The stuff is fed up to the cutters by means of feed rollers, as in some other machines and when the boards or planks are to be tongued and grooved as well as planed I effect this by means of my improved tonguing grooving and jointing heads which revolve horizontally in front of the planing wheel. The head for grooving and jointing is furnished with four bits or cutters of sufficient width to joint the edge of the board or plank and with four grooving bits which extend out beyond the edges of the jointing bits sufficiently to cut the groove to its proper depth. The tonguing head is furnished with four bits that cut the upper rabbet or shoulder of the tongue with two bits to cut the under shoulder or rabbet; with one bit for jointing the edge of the tongue and one bit for chamfering the same arranged and combined in a manner to be presently explained.

In the accompanying drawings Figure 1, is a top view of the principal parts of my machine under that arrangement thereof which I have found by experience to operate well. The rear end which carries the driving or drum shaft is not represented.

The frame A A of the machine may be made either of wood or iron.

B B is a board which is supposed to be under the operation of being planed jointed tongued and grooved.

C, C, are two planing arms which carry the plane irons or cutters the under side of which arms are shown in Fig. 2.

D, D, D, are the upper feeding rollers which are geared to similar rollers below the plank the upper rollers being drawn down by means of elliptic springs, which cross the under side of the machine and are connected to the boxes of the upper rollers by stirrups on the outside of the frame. The upper rollers are geared to the lower by means of wheels E E which have long or finger teeth that allow the necessary play according to the varying thickness of the board.

F, F, are guide pieces immediately under the planing arms upon one of which guide pieces I form a tongue which takes into the groove which has been formed in the plank.

G, is a guide in rear of the planing apparatus and H is a spring bearing the board up against it. These guide pieces are made adjustable to adapt them to stuff of different widths.

I, is a belt proceeding from the main drum shaft and passes around a pulley on the planing wheel shaft giving the necessary motion to it.

I will now proceed to describe the peculiar construction of the planing wheel or arms as represented in Figs. 1, 2, and 3, the latter of which is a transverse section of one of the arms in the line X X of Fig. 2. The irons or cutters pass through slots in the arms, c, c, and and are secured therein by set screws; a, a, are the irons which are double and b, b, the set screws by which they are held in place. The direction in which the edges of the cutters stand as related to each other is distinctly shown at a, a', Fig. 3. In describing this figure I will call a, the point and a' the heel of the cutters.

The dimensions of the planing wheel or arms and their appendages as well as of other parts of the apparatus may of course be varied but I will give those which I have used and have found to answer well in practice.

The arms, C, are eighteen inches long from the center of the shaft to their extremities or if said arms made part of a wheel it would be one of three feet in diameter. A line drawn from the point of one cutter to that of the other would pass through the center of the shaft or middle of the axis but the heels a' a' of the cutters would stand four inches in advance of this line, the cutter being thirteen inches long. This placing of the heels of the cutters in advance of the right line joining their points, in combination with the angle which the edge of the cutters forms with the axis produces the peculiar action of the cutters which I have denominated the longitudinal spiral action. Under my arrangement the heel of the cutter comes first into contact with the face of the board near one edge and operates in a right line on that part while its point is nine inches back of the same line. The first action of the cutter is consequently outward from the center, the heel finishing on a right line while the cutter stands in an oblique direction or an angle of about forty five degrees upon the board and as the cutting action is in right line from the heel to the point when the outer end of the bit has arrived at its lowest or finishing point its heel will have passed the said point or line four inches, and will have been varied about one eighth of an inch above the face of the board. From the nature of the action above described the cutters have an effective forward motion longitudinally, and when the point of the cutter has reached its finishing point its heel will have drawn off about one inch from the inner edge of the board. For a board of twelve inches in width a cutter of thirteen inches will be required. The edges of the cnutter must be ground a little rounding longitudinally, this being necessary to its forming a level surface on the board.

J, J, seen best in Figs. 2 and 3, are the plates of iron or steel that constitute the spring slide that forms one side of the throat of the plane; these are fixed on to secondary arms K, K, that stand in front of the arms C, C, by means of two lugs c c, cast on the hub of the planing wheel; the spring slides are fastened to their arms by means of screws d, d, d; and their pressure on the board may be regulated by set screws e, tapped through the secondary arms, and having their points bear on the inner edge of the spring slides. The construction of these slides and the manner of their attachment are plainly shown in the section Fig. 3. To reduce the friction on the board a conical friction roller may constitute the bearing part of this spring apparatus; the conical form of the roller being adapted to the curve around which it has to pass. The planing arms C, C, I have made five inches deep; the openings, or slots through them to receive the cutters are thirteen and a half inches long and seven eighths of an inch wide. The planing wheel may make from five hundred to seven hundred and fifty revolutions in a minute. It is hung in a sliding frame which may be raised or lowered by means of the hand wheel L L, so as to adapt the cutters to the thickness of the stuff to be planed; for this purpose they may have a range of five or six inches if desired.

I will now proceed to describe another modification of the planing wheel which I have constructed, and have used without the spring slides, although they may be used in combination.

In Fig. 6, of the accompanying drawing I have given a representation of the planing wheel above referred to as an improved modification of that shown in Figs. 2, and 3; and in Fig. 7, I have represented one of the arms as seen in a cross section either in the lines y, y, or z, z, of Fig. 6. In making this wheel I do not leave any throat through the arms for the passage of shavings, the irons or cutters, and the strips of metal by which they are fastened, entirely filling the slots, or openings, made through the arms to receive them. The irons, or cutters are shown at o, o; a rectangular strip of metal p, p, passes into, and fills a recess made in the arms c, c, to receive it; q, Fig. 7, is a screw that is tapped into the arm, the line which receives it being parallel to that of the face of the iron, or cutter o, this screw has a conical end r, which passes into an opening adapted to it in form, at the junction of the strip $p$, with the arm C, one half of said opening being in each piece. It will be seen that under this arrangement the end $r$, of the screw will operate as a wedge and will effectually fasten the iron, or cutter in place; the rectangular form of the strip $p$, will insure a direct bearing on the cutter, and prevent all danger of its shifting while being tightened. To each arm there are two such screws, say in the lines $y$, $y$, and $z$, $z$. Excepting in the particular arrangements above set forth, the planing wheel is like that first described.

In Fig. 1, M, is the tonguing, and N, the grooving head, a separate lateral view of which is given in Figs. 4, and 5. These heads I have made nine inches in diameter. On the tonguing head there are four cutters $f$, which cut the upper shoulder or rabbet, of the tongue, and two, $g$, $g$, which cut the under rabbet; between these there are two shorter cutters $h$, and $i$, one of which, $h$, is straight on its edge and serves to joint the edge of the tongue; and the other, $i$, hollow so as to chamfer, or take off its sharp angles, thus preparing it to enter freely into the groove. The grooving head N, constitutes also a jointing head, as it serves to reduce boards to a width as well as to groove them. It has for this purpose four wide cutters $j$, of sufficient width to joint the thickest board that it is intended to groove. The grooving cutters $k$, are also four in number; these stand out from the jointing cutters to a sufficient distance to cut the groove to its proper depth. These heads I usually make of cast iron, and I confine the cutters in place by means of screws, the heads of which are seen at $m$, $m$; these screws are made tapering, and as they screw in they press out the wedge piece $n$, $n$, against the cutters and hold them firmly in their places; they are therefore very readily removed and adjusted. The tonguing and grooving heads may be raised and lowered at pleasure; and the tonguing head may be moved in and out, in the ordinary way, to adapt it to stuff of different widths. These heads should make about two thousand revolutions in a minute. The machine may be thrown into and out of gear by means of a lever T, T, in a manner well known and which will be seen by inspection; this machine may be driven by any adequate power.

In the drawing O, represents the main driving wheel, carrying a belt P, which gives motion to the main drum shaft at the rear end of the machine, which shaft carries the respective belts, as that marked I, which gives motion to the planing wheel, Q which gives motion to the feeding rollers and U, U, which drive the heads M, and N. The belt Q, drives the pinion R on the shaft of the pulley S, and the gearing therewith connected, as will be seen readily by inspecting the drawing. This gearing may of course be varied from the arrangement represented; and the proper speed of the moving parts may be regulated by the relative sizes of the respective wheels, drums, and pulleys, in a manner well understood by every machinist. I have spoken of two arms and cutters on the planing wheel, there may, however, be three, or more, but two will be found sufficient, and, I believe, best.

Having thus fully described the nature of my planing machine, and shown the construction and operation of the respective parts thereof, what I claim therein as new, and desire to secure by Letters Patent, is—

The particular manner in which I form and arrange the parts concerned in fastening the cutters, or irons, in the planing wheel, under that form or modification of it which is last described in the foregoing specification; these parts consisting of the strip of metal $p$, inserted in the arms, and of the screws $q$, with their tapering points $r$, arranged and operating as set forth, and also the analogous arrangement of the screws and wedge pieces for fastening the cutters of the tonguing, grooving, and jointing heads; the respective irons, or cutters of these heads being formed, arranged, and combined, in the manner above described.

BENJAMIN BICKNELL.

Witnesses:
 Thos. P. Jones,
 Edwin L. Brundage.